Patented May 21, 1935

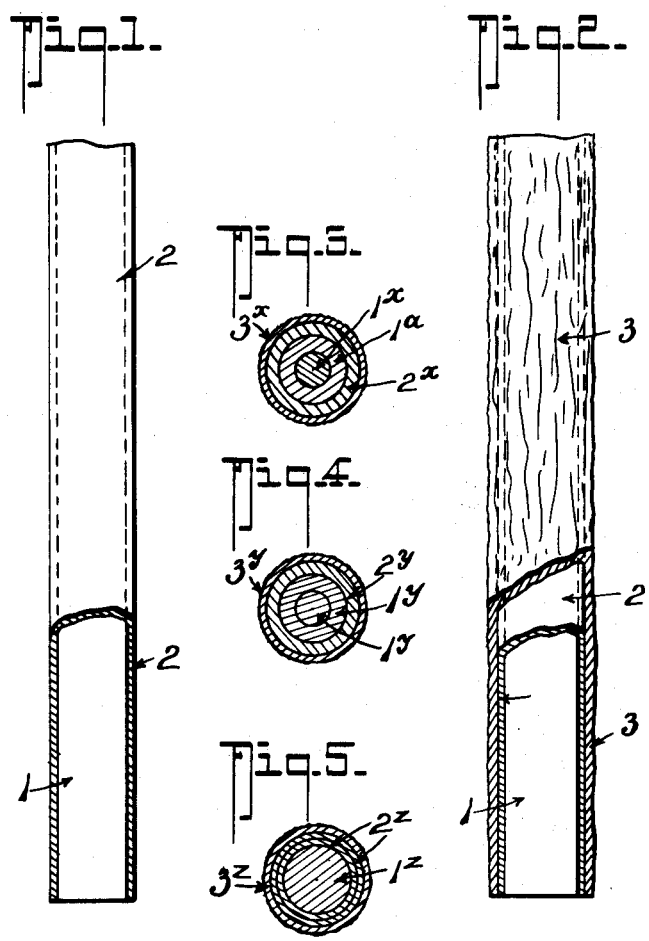

2,001,848

UNITED STATES PATENT OFFICE 2,001,848

ELECTRODE FOR ARC WELDING

August R. Nyquist, Roseau, Minn.

Application October 3, 1932, Serial No. 636,041

5 Claims. (Cl. 219—8)

My invention relates to the art of electric arc welding and it particularly has for an object to provide an electrode which will give a very stable arc and by which the arc may be more readily controlled.

Further, it is an object to provide an electrode of such construction and composition that the arc will, in a measure, be protected and rendered more uniform than by the employment of those electrodes now commonly used for the purpose.

Further, it is an object to provide an electrode composed of a plurality of concentric bodies as a core and its sheath, in which the body having the best electrical conductivity will be located at the inside and the body having the poorest electrical conductivity will be located on the outside whereby the core will melt faster than the envelope, and the envelope will serve as a tube or guide for the material passing over with the arc.

In its more specific nature the invention provides an electrode having a core of copper wire or rod (or a core of other suitable low electrical resistance material) covered by a sheath or envelope of steel, nickel or other suitable substance of higher resistance than that of the core.

Other objects will in part be obvious and in part be pointed out hereinafter.

In the drawing:

Figure 1 is a vertical longitudinal section of a portion of an electrode embodying my invention in its simplest form.

Figure 2 is a similar view of the electrode coated with a suitable flux.

Figures 3, 4 and 5 are cross sections of modifications hereinafter referred to.

In its preferred form the improved electrode comprises a core 1 of copper covered by a sheath or envelope of steel 2 (or nickel or other suitable metal) and for some purposes a further covering of a suitable flux 3.

Experience has shown that copper has about six times the electrical conductivity of steel so by using a steel jacket on a copper core the current will take the path of least resistance which is the central core of copper and will be concentrated in the center of the arc, the sheath of steel acting somewhat as a pipe or conduit for the arc and the melting copper passing over with it to the piece to be welded.

The greatest heat will also be located in the center so the steel sheath will melt slower than the copper core, thereby providing a molten crater in the central part of the electrode.

However, the molten center cannot be deposited any faster than the outside envelope is melted, thus the deposit of the material from the electrode is retarded. A greater amount of current will thus pass through the electrode for the amount of deposit that is made, thereby making a very stable arc and giving more time for heating the base material properly, insuring fusion or greatly aiding the proper fusion. (Should the material be deposited faster than would permit the arc properly to heat the base material the bond between the base material and the deposited material will be poor and the weld will be worthless. Also, if the material is deposited too fast across the arc it will be so dense in the arc that the current will be conducted by it, thus making a wild, uncontrollable arc, all of which objectionable features are overcome by my improved electrode).

Further it is to be understood that when it is desired to have an alloy deposit and when the alloy has two materials composing it, one being a better conductor than the other, by using the best conducting material for the core and the material having the greatest electrical resistance for the jacket, the electrical arc will be stabilized corresponding to the difference in the conductivity of the materials composing the electrode.

In most cases there will have to be used a suitable flux in connection with the electrode, however there are materials where a flux would not be required, but where there is any copper in the makeup of the electrode flux will have to be used. In the welding of cast iron, copper is a very important material by reason of its yielding qualities, for such castings as cylinders, or any casting where contraction and expansion come into play. It is common knowledge that castings and nearly all materials in being heated will expand or contract in cooling, therefore it will be understood that if we should weld in the center of a casting, leaving the outside cold, and if the outside would not yield then the heated center would have to contract or upset in itself. However, in cooling, the heated metal would still contract and if the nature of the material is to be such that it could not yield it will rupture either the deposit or the casting.

Pure copper is an ideal metal for cold welding of cast iron. However, pure copper cannot be successfully deposited through the arc for the reason that pure copper would deposit too fast, not producing heat enough to melt the base metal, since this metal would deposit so fast that the base material would not have time to melt and properly fuse with the deposited material. Further, by using plain copper wire as an electrode, the arc would be very wild and practically impossible to control. I correct this condition by the use of a suitable sheath over the copper rod, preferably steel, which in turn is properly flux coated, and this combination gives complete control of the arc, as has been already herein explained. This does not in any sense produce an alloy, as the oxygen in the copper reacts on the steel and consumes it. I have given this combination the name of "copper-arc" electrodes.

A suitable flux 3 to use with my rod may be made by taking approximately equal parts of magnesium sulphate and bicarbonate of soda and, after separately dissolving same in hot water, bring the solutions together to produce a compound which I shall, for convenience, hereinafter refer to as "basic compound".

To about 28% (variable limit 20% to 30%) of "basic compound" I add separately hot aqueous solutions of potassium nitrate 36% (variable limit 20% to 40%), borax 10% (variable limit 5% to 15%), and then add calcium carbonate 26% (variable limit 25% to 45%). Sufficient of the magnesium sulphate and sodium bicarbonate are used so as to liberate all the carbon dioxide present, i. e. sufficient of each to neutralize one another. Then the solutions of potassium nitrate and borax are added and finally the calcium carbonate is added. This forms a paste which is used to coat the electrode and serve as the flux.

In Figures 3, 4 and 5 I have illustrated modifications of my invention.

As shown in Figure 3 the core is composed of two metals 1a—1x, while the sheath or case is composed of only one metal 2x covered by the flux 3x. In this arrangement the metal 1a is the one having the greatest conductivity and the metal 2x has the least conductivity. For instance the metal 1a may be copper containing a filling 1x of cast iron while the metal 2x may be cast iron or steel.

As shown in Figure 4 the core is composed of a metal 1y—1y in a plurality of layers, which metal is of good conductivity, while the sheath or case is composed of a metal 2y of poor conductivity covered by the flux 3y.

As shown in Figure 5 the core 1z of metal of good conductivity is encased in a sheath 2z composed of a plurality of layers of metal of poor conductivity. An essential feature of the invention is that the sheath or jacket, regardless of the number of layers of the same or different metals used in its make-up, shall be of relatively poor conductivity while the core, regardless of the number of layers of the same or different metals used, shall be of relatively good conductivity.

The number of materials used in the make-up of the rod may be varied as desired to give the alloy desired.

From the foregoing it is thought my invention and its advantages will be readily understood by those skilled in the art.

I do not claim to be the first to make a cored electrode, but what I claim is:

1. An electrode comprising a core of material having relatively good electrical conductivity and surrounded by a sheath of material having relatively poor electrical conductivity, and a flux combined with the aforesaid structure as an envelope therefor and composed of "basic compound", potassium nitrate, borax, and calcium carbonate in substantially the proportions stated.

2. An electrode comprising a metallic core having a high degree of electrical conductivity surrounded by a metallic sheath having a low degree of electrical conductivity, and a flux combined with the aforesaid structure as an envelope therefor and composed of "basic compound", potassium nitrate, borax, and calcium carbonate in substantially the proportions stated.

3. An electrode composed of a metal core and a metal sheath enveloping the core, the core having greater electrical conductivity than the sheath, and a flux combined with the aforesaid structure as an envelope therefor and composed of "basic compound", potassium nitrate, borax, and calcium carbonate in substantially the proportions stated.

4. An electrode for electric arc welding of cast iron comprising a copper core surrounded by a steel sheath.

5. An electrode composed of a copper core and a steel sheath surrounding the copper core and an envelope composed of a suitable flux around the steel sheath.

AUGUST R. NYQUIST.